United States Patent [19]

Sakai et al.

[11] Patent Number: 4,961,643
[45] Date of Patent: Oct. 9, 1990

[54] METHOD OF AND APPARATUS FOR MEASURING SPEED

[75] Inventors: Izumi Sakai, Solihull; Gabriel Donaldson, Birmingham; Nicholas J. Chilton, Warley, all of Great Britain

[73] Assignee: Lucas Industries Public Limited Company, Birmingham, Great Britain

[21] Appl. No.: 307,538

[22] Filed: Feb. 8, 1989

[30] Foreign Application Priority Data

Feb. 17, 1988 [GB] United Kingdom ............... 88 03683

[51] Int. Cl.$^5$ ............................................... G01P 3/36
[52] U.S. Cl. ...................................... 356/28; 356/373
[58] Field of Search .................................. 356/28, 373

[56] References Cited

U.S. PATENT DOCUMENTS

| | | |
|---|---|---|
| 3,486,032 | 12/1969 | Cufflin . |
| 3,994,583 | 11/1976 | Hutchins . |
| 4,040,741 | 8/1977 | Swift . |
| 4,273,430 | 6/1981 | Fritsche et al. . |
| 4,725,136 | 2/1988 | McCullough et al. ............ 356/28.5 |

Primary Examiner—Stephen C. Buczinski
Attorney, Agent, or Firm—Nixon & Vanderhye

[57] ABSTRACT

A speed measuring apparatus, for instance for measuring the speed of a vehicle over the ground, comprises a plurality of photodetectors arranged to view consecutive regions along parallel light paths. The photodetectors are arranged as two sets of alternating photodetectors whose combined outputs are subtracted to provide a signal whose frequency represents speed and is insensitive to height.

11 Claims, 3 Drawing Sheets

METHOD OF AND APPARATUS FOR MEASURING SPEED

The present invention relates to a method of and an apparatus for measuring speed. Such a method and apparatus may, for instance, be used to measure the speed over ground of a vehicle.

A known technique for measuring vehicle ground speed uses cross-correlation between the outputs of two sensors. Each sensor comprises a light sensitive element such as a phototransistor arranged at the focal point of a convex lens. The sensors are spaced apart longitudinally on the vehicle with the optical axes of the lenses vertical. During movement of the vehicle, the sensors receive reflected light from the same path along the ground but with a time delay between the time at which the first sensor images each point on the path, and the time at which the second sensor images the point. By cross-correlating the outputs of the two sensors, the time delay can be found and the ground speed calculated from the time delay and the known spacing of the sensors.

The cross-correlation technique is accurate and reliable and is not affected by changes in height of the sensors with respect to ground, for instance caused by the normal movement of a vehicle on its suspension. However, cross-correlation requires a large amount of computation, which makes it expensive, slow and unsuitable for speed measurement, especially for antiskid devices, on board a vehicle.

Another known technique for measuring vehicle ground speed is illustrated in FIG. 1 of the accompanying drawings and comprises a lens 1 which images the ground or road surface 2 onto a photodetector 3 through the spatial filter 4 disposed immediately in front of the photodetector 3. The output signal of the photodetector approximates a sinewave of a frequency proportional to the spatial frequency Fs of the spatial filter 4 and the speed v with respect to the road surface 2, assuming that the height of the lens 1 above the road surface 2 is substantially constant A practical disadvantage of this technique is that this height does vary substantially. The constant of proportionality is equal to B/H, where B is the distance between the lens 1 and the filter 4 and H is the height of the lens above the road surface. Also, the lens has to have a large aperture, for instance a diameter of about 30 mm, and the photosensitive surface of the photodetector has to be relatively large which calls for relatively expensive components to be used. The components have to be positioned accurately and/or accurately calibrated before use, which makes manufacture inconvenient and expensive.

Some of these disadvantages are overcome by the arrangement illustrated in FIG. 2 of the accompanying drawings. In this arrangement, two interdigitated arrays 10 of photodetectors are used in place of the single large photodetector and separate spatial filter, and are connected to the inverting and non-inverting inputs of a differential amplifier 11 so as to perform the same function. Each array is provided with a preamplifier 12, 13 to increase the signal level. In order to make the speed measurement independent of height, an optical slit 14 is disposed between the lens 1 and the arrays 10 at the focal point of the lens. The fundamental frequency f of the raw i.e. unprocessed signal Sr at the output of the differential amplifier 11 is then given by:

$$f = (A/F) \cdot Fs \cdot V,$$

where A is the distance between the slit 14 and the arrays 10, F is the focal length of the lens 1, and Fs and v are as defined above.

FIG. 2 illustrates further possible signal processing means comprising a comparator 15 for providing a squarewave output Ss and a frequency/voltage converter 16 for providing an output signal Sv whose voltage represents the measured speed Although the presence of the slit 14 makes the arrangement of FIG. 2 insensitive to variations in height, the slit 14 drastically reduces the amount of light reflected from the road surface 2 onto the arrays 10 of photodetectors This greatly reduces the signal-to-noise ratio of the output-signals of the arrays and again requires the use of a large and costly lens 1. Compensation for the loss of light can be provided by increasing the intensity of surface illumination, for instance by providing powerful light sources 17 and 18. However, this substantially increases the cost of the system and makes reliability of the system dependent on the reliability and longevity of the light sources. Also, this arrangement still suffers from the disadvantage that the various components have to be assembled in the precise relationship to each other.

According to a first aspect of the invention, there is provided an apparatus for measuring speed, comprising: a plurality of photodetectors arranged to view light passing along substantially parallel paths from consecutive regions of a cooperating surface, the photodetectors being arranged in first and second sets with the photodetectors of the first set being arranged to view alternate regions of the cooperating surface; and means for forming the difference between a combined output of the first set of photodetectors and a combined output of the second set of photodetectors.

It is thus possible to dispense with the large and expensive imaging lens as used in previously known arrangements. Illumination of the cooperating surface, such as the ground, is normally necessary but, because there is no need to use a slit in order to make the speed measurement independent of height, it is not necessary to provide the more intense illumination required by arrangements of the type shown in FIG. 2. Because the photodetectors view the surface along parallel light paths, variations in height of the photodetectors with respect to the surface have no effect on the measurement of speed. The speed is represented by the frequency of the output signal of the difference forming means, which frequency is equal to the product of the spatial frequency of the photodetectors and the speed of relative movement between the photodetectors and the surface. Normally, the photodetectors will be arranged as an evenly spaced linear array for measuring translational speed in which case the spatial frequency is equal to the reciprocal of the spacing between adjacent photodetectors. However, other configurations are possible, such as arranging the photodetectors along a circular arc in order to measure rotary speed.

Preferably each of the photodetectors is responsive to light travelling parallel to the light path within a prismatic beam. Each photodetector thus views a region of the surface which is of constant shape and area irrespective of the height above the surface and which does not overlap with any other region viewed by another photodetector. The output signal of the difference forming means is thus completely insensitive to variations in height. This may be achieved by arranging each photodetector as a photosensitive transducer disposed at the focal point of a converging lens. However, in practice, it is difficult to restrict light sensitivity from a photodetector to a prismatic beam and convergence or divergence of the beam can be tolerated without compromising the independence of speed measurement of height. It is preferable for the regions viewed by the photodetectors to be non-overlapping for any height which is likely to occur in practice. However, this is not essential to correct operation and overlapping of the viewed regions is permissible. It is necessary for the viewed regions to be non-identical. The permissible degree of overlap will depend on the particular configuration of the apparatus, the surface, and other factors and can readily be ascertained for any particular situation.

Preferably an optical slit is disposed in front of each of the photodetectors. Such slits are useful for helping to define the beams of the photodetectors but need not be so small as to restrict substantially the amount of light received and require special measures to provide sufficient illumination of the surface.

In order to avoid undesirable signal components in the output signal of the difference forming means caused by sidelobes of the spatial filtering, the individual contributions by the photodetectors to the combined outputs may be weighted so as to emphasise the contributions of middle photodetectors with respect to end photodetectors. Where optical slits are provided, this may be achieved by making the slits of the middle photodetectors wider than the slits of the end photodetectors. Alternatively, this may be achieved by applying a greater gain to the output signals of the middle photodetectors than to those of the end photodetectors.

The difference forming means preferably comprises a differential amplifier. Preferably the output of the differential amplifier is connected to the input of a bandpass filter whose output is connected to the input of a comparator. Such signal processing results in rectangular or squarewave signals which are convenient for counting or other processing. A frequency-to-voltage converter may be connected to the output of the comparator in order to provide a signal whose level is proportional to speed.

According to a second aspect of the invention, there is provided a method of measuring speed, comprising forming a first combined output by detecting light passing along a plurality of parallel first paths from a plurality of first regions of a cooperating surface, forming a second combined output by detecting light passing along a plurality of second light paths parallel to the first light paths from a plurality of second regions of the cooperating surface which alternate with the first regions, and forming the difference between the first and second combined outputs.

The invention will be further described, by way of example, with reference to the accompanying drawings, in which.

Figure 1:
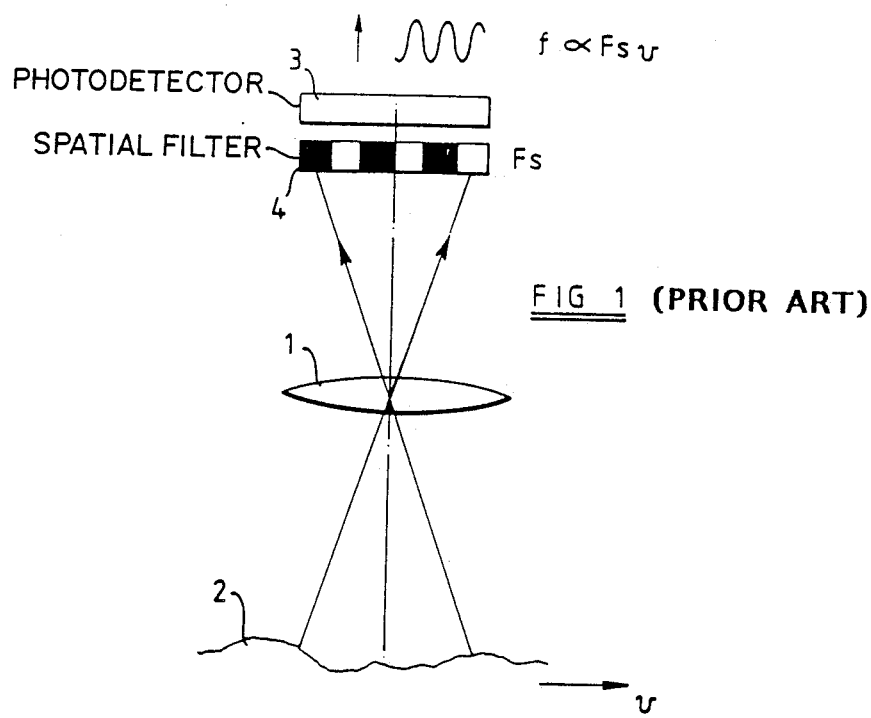
FIGS. 1 and 2 illustrate diagrammatically prior art speed measuring apparatuses.
Figure 2:
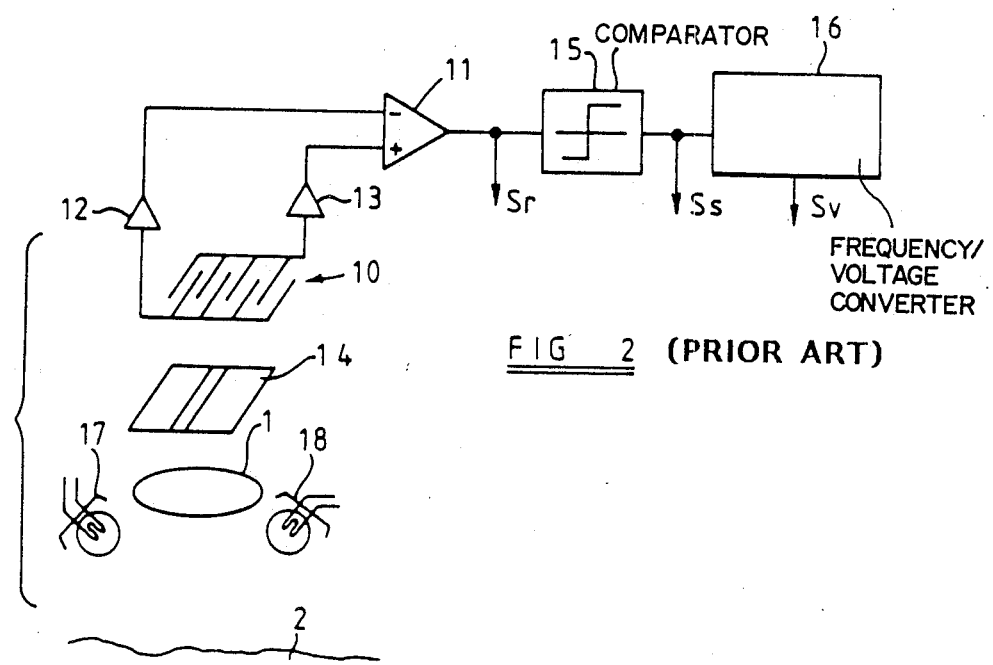
Figure 3:
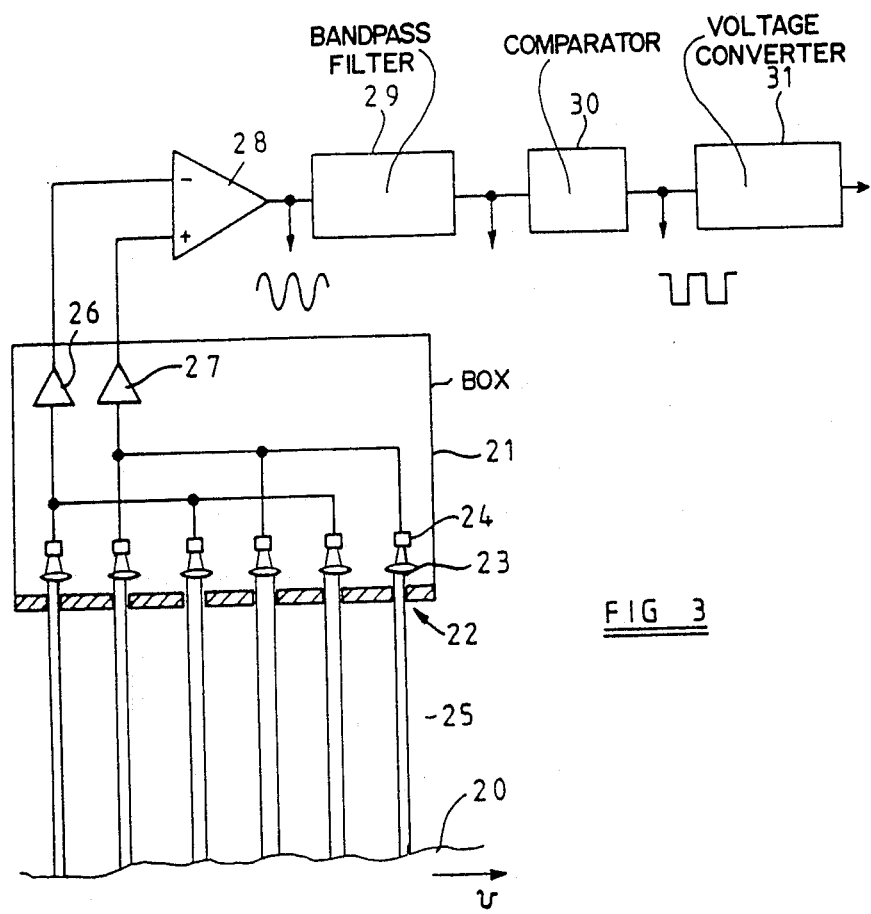
FIG. 3 is a diagram of a speed measuring apparatus constituting a preferred embodiment of the invention.

The apparatus shown in FIG. 3 is intended for measuring the speed over the ground of a vehicle, for instance for antiskid (anti wheel-lock) brake systems or route guidance applications. The ground is shown as 20 and the speed v of the vehicle on which the apparatus is mounted is indicated by an arrow.

The apparatus comprises a box 21 whose lower surface is provided with a plurality of slits such as 22 extending transversely to the direction of movement of the vehicle. Apart from the slits 22, the box is light-tight. Behind each of the slits 22 is located a photodetector comprising a converging lens 23 and a phototransistor 24 located at the focal point of the lens 23. In the preferred embodiment, ten photodetectors are provided, although only six of these are shown in FIG. 3 for reasons of clarity. In a preferred embodiment, each of the phototransistors 24 and lenses 23 is provided by a device of type number OP843, which is available from many sources. The lens 23 is provided by an integral plastics lens with the light sensitive area of the phototransistor 24 located at the focus.

The photodetectors are arranged as a linear array extending parallel to the direction of movement of the vehicle. The photodetector and the slits 22 are evenly spaced, and a spacing of 8 mm has proved satisfactory. The widths of the slits 22 may be between 1 and 5 mm and may all be equal. However, in order to remove the effects of the slidelobes of the spatial filter formed by the slits and the photodetectors, the widths of the slits vary from a minimum value for the slits at the two ends of the array to a maximum value for the slits at the middle. For instance, in the case of ten photodetectors, the innermost pair of slits have widths of 5 mm, the next slit in each direction has a width of 4 mm, and so on, so that the slit at each end has a width of 1 mm.

The photodetectors are arranged such that the optical axes of the lenses 23 are parallel to each other and extend vertically downwards with the apparatus installed in the vehicle. Because of the finite sizes of the sensitive areas of the phototransistors 24, the photodetectors respond primarily to light travelling parallel to the optical axes within a "beam" as indicated by the "light cones" such as 25. The extent of each beam is mainly defined by the optical system comprising the slit 22 and the lens 23 in front of each phototransistor 24. The arrangement is such that, for all heights of the lower surface of the light box 21 above the ground 20 which are likely to be encountered in practice i.e. for the extent of vertical movement of the vehicle on its suspension, the photodetectors view non-overlapping regions of the ground surface which are spaced evenly and are consecutive in the direction of movement of the vehicle.

The photodetectors are arranged as two sets, a first of which is connected to a preamplifier 26 and a second of which is connected to a preamplifier 27. The first set of photodetectors comprises alternate photodetectors in the direction of movement of the vehicle, and the second set comprises the remaining photodetectors, which, therefore, alternate with the photodetectors of the first set.

The outputs of the preamplifiers 26 and 27 are connected to inverting and non-inverting inputs of a differential amplifier 28 whose output, when the apparatus is in use and the vehicle is in motion, produces a signal resembling a sinewave. This signal is filtered by a bandpass filter 29 whose output signal is supplied to a comparator 30 which produces a rectangular or squarewave output. The output signal of the comparator 30 is supplied to a frequency-to-voltage converter 31. The output of the comparator 30 is used for counting purposes, for instance to provide a digital display of speed, and the output of the converter 31 may be used to drive an analogue display of speed.

The arrangement of the photodetectors avoids the need for expensive optical systems, and is not critical to manufacture. The lenses 23 provided integrally with the phototransistors 24 are sufficient, together with the slits 22, to define the beams of the photodetectors and it is merely necessary to ensure that the photodetectors are arranged so that they look vertically downward through the corresponding slits 22. This arrangement can be manufactured easily and inexpensively, the photodetectors being relatively inexpensive standard components. The effective apertures of the photodetectors are relatively large and, although ground illumination is normally required, there is no need for special arrangements to provide intense illumination of the ground surface.

Figure 4A:
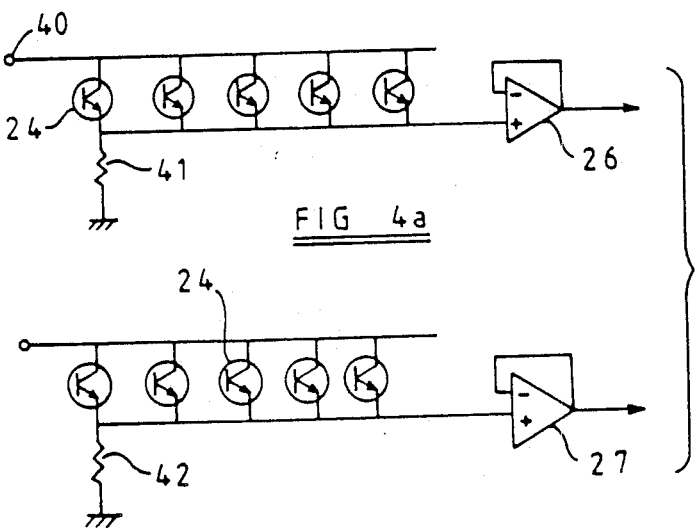
FIGS. 4a and 4b show circuit diagrams of parts of the apparatus of FIG. 3.

FIG. 4a illustrates the phototransistors 24 and the preamplifiers 26 and 27. The collectors of the phototransistors of the first set are connected to a terminal 40 for receiving a positive supply voltage. The emitters of the phototransistors 24 are connected together and via a load resistor 41 to a common supply line indicated in the figures by a ground connection. The emitters of the phototransistors are also connected to the non-inverting input of an operational amplifier which forms the preamplifier 26 and is arranged as a unity gain buffer with its output connected to its inverting input. The second set of phototransistors is provided with load resistor 42 and these transistors and the preamplifier 27 are connected in the same way as for the first set of phototransistors.

Figure 4B:
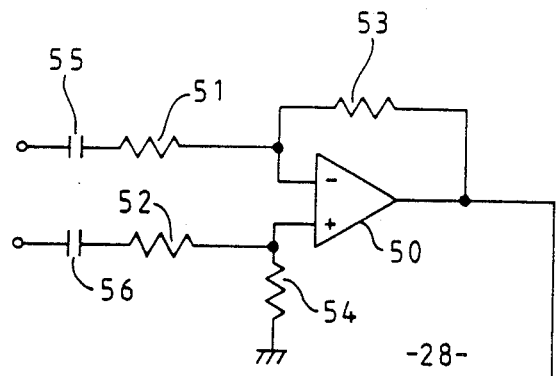
Figure 4B:
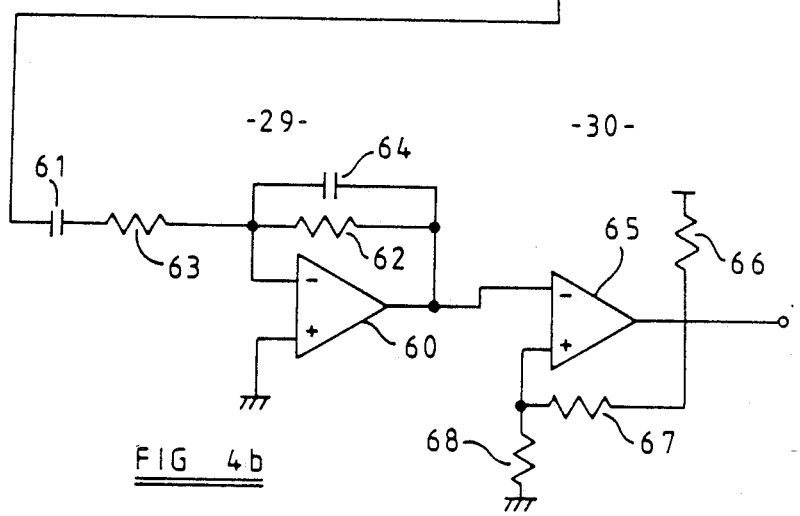

The outputs of the preamplifiers 26 and 27 are connected to the inverting and non-inverting inputs, respectively, of the differential amplifier 28 shown in FIG. 4b. The differential amplifier comprises an operational amplifier 50, resistors 51 to 54, and capacitors 55 and 56.

The output of the operational amplifier 50 is connected to the bandpass filter 29. The bandpass filter 29 comprises an operational amplifier 60 whose non-inverting input is connected to the common supply line and whose inverting input is connected to the output of the operational amplifier 50 via a capacitor 61 and a resistor 63 in series and to the output of the operational amplifier by a resistor 62 and a capacitor 64 in parallel.

The comparator 30 comprises a comparator integrated circuit 65 whose inverting input is connected to the output of the bandpass filter 29. The output of the integrated circuit 65 is connected via a load resistor 66 to the positive supply line and via series-connected resistors 67 and 68 to the common supply line. The non-inverting input is connected to the connection between the resistors 67 and 68, this arrangement providing some hysteresis in the operation of the comparator so as to ensure stability of operation.

There are two possible output arrangements, depending on the desired mode of operation. If the apparatus is required to produce a pulse signal, for instance for counting purposes so as to provide a digital display of speed, then the output from the comparator 30 is connected to a frequency counter (not shown). Alternatively or additionally, if the apparatus is required to produce a signal whose voltage or level corresponds to the speed, for instance in order to provide an analogue display, then the output of the comparator 30 is connected to the frequency-to-voltage converter 31 shown in FIG. 3.

We claim:

1. An apparatus for measuring speed relative to a co-operating surface, said apparatus comprising:
   a plurality of photodetector means for viewing light passing along substantially parallel paths from consecutive regions of said co-operating surface, said plurality of photodetector means comprising an array aligned parallel to a direction of travel between said apparatus and said cooperating surface, said substantially parallel paths in one region are substantially parallel to substantially parallel paths in an adjacent region, each of said photodetector means comprising means responsive to light reflected from a respective one of the consecutive regions within a beam of substantially constant cross-sectional area and shape extending from the respective one of the consecutive regions to said photodetector means, said plurality of photodetector means comprising first and second sets of photodetector means, said first set comprising a means for viewing alternate regions of the co-operating surface;
   first means for forming a first combined output of said first set;
   second means for forming a second combined output of said second set; and
   subtracting means for forming the difference between the first combined output and the second combined output.

2. An apparatus as claimed in claim 1, in which said photodetectors are arranged as an evenly spaced linear array.

3. An apparatus as claimed in claim 1, in which each of said photodetectors comprises a photosensitive transducer and a converging lens having a focal point, said photosensitive transducer being disposed at the focal point of said converging lens.

4. An apparatus as claimed in claim 1, in which there is provided means defining a plurality of optical slits such that each slit is arranged in front of a respective one of said photodetectors.

5. An apparatus as claimed in claim 1, in which there are provided means for applying respective weightings to contributions of said photodetectors to the first and second outputs.

6. An apparatus as claimed in claim 5, in which said weighting applying means apply greater weights to the contributions of middle ones of said photodetectors than to the contributions of end ones of said photodetectors.

7. An apparatus as claimed in claim 4, in which said slit defining means define slits of greater width in front of the middle ones of said photodetectors than the slits in front of end ones of said photodetectors.

8. A method of measuring relative speed between a surface and a device, comprising the steps of:
   (a) detecting light passing along a plurality of parallel first light paths from a plurality of first regions of said surface to said device;
   (b) forming a first combined output representing the light detected in said step (a);
   (c) detecting, at a point displaced with respect to said first detecting step along a movement direction, light passing along a plurality of second light paths parallel to the first light paths from a plurality of second regions of said surface to said device, wherein said second regions alternate with the first regions;

(d) forming a second combined output representing the light detected in said step (c); and (e) forming an indication of relative speed between said device and said surface by forming the difference between the first and second combined outputs.

9. An apparatus for measuring speed with respect to a co-operating surface, said apparatus comprising:

a plurality of photodetectors arranged to view light passing along substantially parallel paths from consecutive regions of a co-operating surface, said photodetectors being arranged as first and second sets with said photodetectors of said first set being arranged to view alternate regions of the co-operating surface;

first means for forming a first combined output of said first set of detectors;

second means for forming a second combined output of said second set of said photodetectors;

subtracting means for forming the difference between the first combined output and the second combined output; and weighting means for applying respective weightings to contributions of said photodetectors to the first and second outputs, said weighting means applying greater weightings to the contributions of middle ones of said photodetectors than to the contributions of end ones of said detectors.

10. An apparatus as defined in claim 9, in which said photodetectors are arranged as an evenly spaced linear array.

11. An apparatus as claimed in claim 9, in which said weighting means comprise means defining a plurality of optical slits such that each slit is arranged in front of a respective one of said photodetectors and such that the slits in front of said middle ones of said photodetectors are of greater width than the slits in front of said end ones of said photodetectors.

* * * * *